US009479536B2

(12) United States Patent
Wilkerson et al.

(10) Patent No.: US 9,479,536 B2
(45) Date of Patent: Oct. 25, 2016

(54) SYSTEM AND METHOD OF SECURING MONITORING DEVICES ON A PUBLIC NETWORK

(75) Inventors: Patrick Wilkerson, Victoria (CA); John C. Van Gorp, Sidney (CA); Peter Cowan, Victoria (CA)

(73) Assignee: SCHNEIDER ELECTRIC USA, INC., Palantine, IL (US)

( * ) Notice: Subject to any disclaimer, the term of this patent is extended or adjusted under 35 U.S.C. 154(b) by 0 days.

(21) Appl. No.: 13/341,486

(22) Filed: Dec. 30, 2011

(65) Prior Publication Data

US 2013/0174261 A1 Jul. 4, 2013

(51) Int. Cl.
G06F 21/24 (2006.01)
H04L 29/06 (2006.01)
H04L 12/24 (2006.01)
H04L 29/08 (2006.01)

(52) U.S. Cl.
CPC .............. H04L 63/20 (2013.01); H04L 41/18 (2013.01); H04L 41/5064 (2013.01); H04L 67/125 (2013.01); H04L 63/1408 (2013.01); H04L 63/1433 (2013.01)

(58) Field of Classification Search
CPC . H04L 67/125; H04L 63/1433; H04L 63/20; H04L 41/5064; H04L 63/1408; H04L 41/18
USPC .......................................................... 726/25
See application file for complete search history.

(56) References Cited

U.S. PATENT DOCUMENTS

| 7,400,241 | B2 * | 7/2008 | Horitgami et al. ........... 340/506 |
|---|---|---|---|
| 8,078,720 | B2 * | 12/2011 | Kawana ........................ 709/224 |
| 8,200,863 | B2 * | 6/2012 | Ishihara ......................... 710/64 |
| 2006/0277446 | A1 * | 12/2006 | Ikeno et al. .................... 714/47 |
| 2007/0005738 | A1 | 1/2007 | Alexion-Tiernan et al. |
| 2008/0044006 | A1 * | 2/2008 | Kitagawa ................. 379/433.01 |
| 2008/0077425 | A1 * | 3/2008 | Johnson et al. .................. 705/1 |
| 2009/0113481 | A1 * | 4/2009 | Friedman ........................ 725/46 |
| 2011/0231584 | A1 | 9/2011 | Ishihara |
| 2011/0271319 | A1 | 11/2011 | Venable |

FOREIGN PATENT DOCUMENTS

EP 1956463 A2 8/2008

OTHER PUBLICATIONS

PCT International Search Report mailed Jun. 26, 2013 in International Application No. PCT/US2012/072122, filed Dec. 28, 2012.
PCT Written Opinion of the International Searching Authority mailed Jun. 26, 2013 in International Application No. PCT/US2012/072122, filed Dec. 28, 2012.

* cited by examiner

Primary Examiner — Kambiz Zand
Assistant Examiner — Aubrey Wyszynski
(74) Attorney, Agent, or Firm — Lando & Anastasi, LLP

(57) ABSTRACT

A method for determining whether or not a monitor is registered with a security service. The method includes using a device search engine to perform a search for and find a monitor. Then it is determined whether or not the found monitor is registered with the security service. When the found monitor is not currently registered with the security service, an owner of the unregistered monitor is automatically contacted.

12 Claims, 5 Drawing Sheets

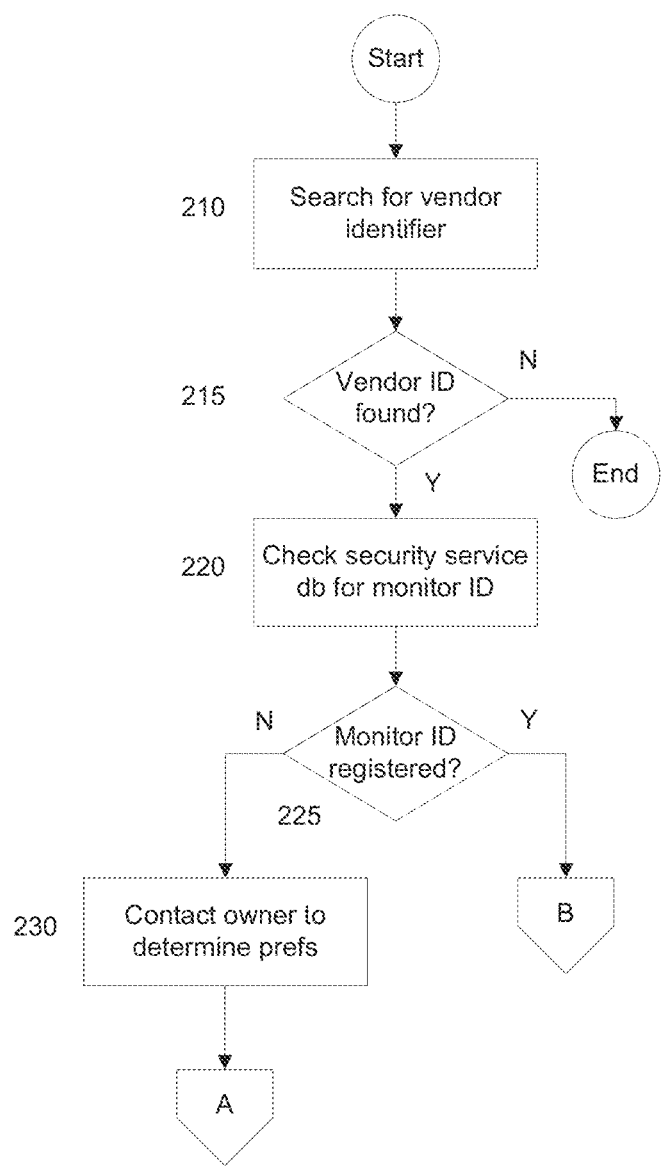

SYSTEM AND METHOD OF SECURING MONITORING DEVICES ON A PUBLIC NETWORK

TECHNICAL FIELD

The present disclosure relates to a system and method of detecting and registering unsecured monitoring devices attached to a public network (e.g., the Internet), and, more particularly, in some implementations, to a security service that periodically reviews predefined security preferences for registered monitoring devices, performs a security scan if the security preferences dictate that it should, and takes action as directed by the security preferences.

BACKGROUND

Best practice may dictate that monitoring devices should not be directly accessible from the Internet, but mistakes or changes in network configuration may grant unfettered access to such devices. When monitoring devices are intentionally connected directly to the Internet, steps may initially be taken to secure access to data and device actions, but over time untrained users may change the device configuration and undo such secure access.

SUMMARY

Embodiments of the current invention may include one or more of the following improvements and differences over the closest known technology:

Vendor and monitor identifiers may be used in the responses that monitors provide when requests are made for IP services supported by the monitor (see FIG. 2a and supporting text);

A security service may use a device search engine to find devices of interest (possibly by searching for specific character strings in indexed device responses) and then probes each device for information that can be used to contact the customer that owns it;

A security service may discover monitoring devices which are openly accessible from a public network (e.g., the Internet), identify the owners of these monitoring devices, and give the owners the ability to register their monitoring devices with the security service and specify security preferences for each device;

A security service may perform a security scan of monitoring devices registered with the security service, checking for specific security elements as defined in preferences defined and maintained by the monitoring device owners; and A monitoring device connected to both a public network (e.g., the Internet) and an internal network may act as a gateway for communications between clients on a public network (e.g., the Internet) and other monitoring devices only connected to the internal network (see FIG. 1 and supporting text discussing monitor 160 and monitors 180).

One embodiment includes a method for determining whether or not a monitor is registered with a security service. The method includes using a device search engine to perform a search for and find a monitor. Then it is determined whether or not the found monitor is registered with the security service. When the found monitor is not currently registered with the security service, an owner of the unregistered monitor is automatically contacted.

Another embodiment includes a method for determining whether or not a monitor is registered with a security service. The method includes automatically determining whether or not a communication port of the monitor is enabled to communicate with a public network. Then, when it is determined that the communication port is enabled to communicate with a public network, it is automatically determined whether or not the public network can actually be accessed via the communication port. When it is determined that the public network can actually be accessed via the communication port, the security service is automatically contacted and provided with information sufficient to determine whether or not the monitoring device is registered with the security service.

Yet another embodiment includes a method for determining whether or not a monitor is registered with a security service. The method includes receiving a request from a monitor to determine whether or not the monitor is registered with the security service. Then it is determined whether or not the monitor is registered with the security service device. When it is determined that the monitor is not currently registered with the security service, an owner of the unregistered monitor automatically contacted.

In another embodiment, a method of performing a security scan of a monitor is provided. The method includes retrieving at least one security preference for a monitor that is registered with a security service. Then, the registered monitor is checked based on the security preference. It is then determined whether or not the registered monitor meets the security preference based on a result of the monitor check.

In yet another embodiment, a security service device is provided which includes an electronic data storage medium and an electronic data processing device. The security service device is configured to use a device search engine to perform a search for and find a monitor. When the found monitor is not currently registered with the security service device, the security service device is further configured to automatically contact an owner of the unregistered monitor.

Another embodiment involves a monitoring device which includes an electronic data storage medium, an electronic data processing device, and at least one communication port. The monitoring device is configured to automatically determine whether or not the communication port is enabled to communicate with a public network. When the communication port is enabled to communicate with a public network, the monitoring device automatically determines whether or not the public network can actually be accessed via the communication port. In addition, when the public network can actually be accessed via the communication port, the monitoring device automatically contacts a security service and provides the security service with information sufficient to determine whether or not the monitoring device is registered with the security service.

Yet another embodiment involves a security service device which includes an electronic data storage medium and an electronic data processing device. The security service device is configured to receive a request from a monitor to determine whether or not the monitor is registered with the security service device. The security service device also determines whether or not the monitor is registered with the security service device. When the monitor is not currently registered with the security service device, the security service device automatically contacts an owner of the unregistered monitor.

A further embodiment involves a security service device which includes an electronic data storage medium and an electronic data processing device. The security service device is configured to retrieve at least one security preference for a monitor that is registered with the security service device. The security service device also checks the registered monitor based on the security preference. The security service device then determines whether or not the registered monitor meets the security preference based on a result of the monitor check.

Throughout the specification and claims, the following terms take at least the meanings explicitly associated herein, unless the context dictates otherwise. The meanings identified below do not necessarily limit the terms, but merely provide illustrative examples for the terms. The phrase "an embodiment" as used herein does not necessarily refer to the same embodiment, though it may. In addition, the meaning of "a," "an," and "the" include plural references; thus, for example, "an embodiment" is not limited to a single embodiment but refers to one or more embodiments. Similarly, the phrase "one embodiment" does not necessarily refer the same embodiment and is not limited to a single embodiment. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise.

It will be appreciated by those skilled in the art that the foregoing brief description and the following detailed description are exemplary (i.e., illustrative) and explanatory of the present invention, but are not intended to be restrictive thereof or limiting of the advantages which can be achieved by this invention in various implementations. Additionally, it is understood that the foregoing summary and ensuing detailed description are representative of some embodiments of the invention, and are neither representative nor inclusive of all subject matter and embodiments within the scope of the present invention. Thus, the accompanying drawings, referred to herein and constituting a part hereof, illustrate embodiments of this invention, and, together with the detailed description, serve to explain principles of embodiments of the invention.

BRIEF DESCRIPTION OF THE DRAWINGS

Aspects, features, and advantages of some embodiments of the invention, both as to structure and operation, will be understood and will become more readily apparent when the invention is considered in the light of the following description made in conjunction with the accompanying drawings, in which like reference numerals designate the same or similar parts throughout the various figures, and wherein:

FIG. 2a shows a flow chart illustrating an embodiment of how a security service may interact with a device search engine to find monitors that may be directly connected to the Internet;

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Some embodiments of the present invention describe a system and method of detecting and registering unsecured monitoring devices attached to a public network (e.g., the Internet). While the embodiments below frequently refer to the Internet, it is clear that the embodiments apply equally to any public network and are not limited solely to Internet application. A security service may use a device search engine to search for characteristics that identify monitoring devices of interest. Alternately or additionally, a monitoring device may contact the security service and directly register itself with the service, or a monitoring device owner may contact the security service and register one or more monitoring device. The security service periodically (e.g., at regular or irregular time intervals, depending on the implementation) uses the device search engine and attempts to find additional, unregistered monitoring devices. The security service also periodically reviews predefined security preferences for registered monitoring devices, performs a security scan if the security preferences dictate that it should, and takes action as directed by the security preferences.

Figure 1:
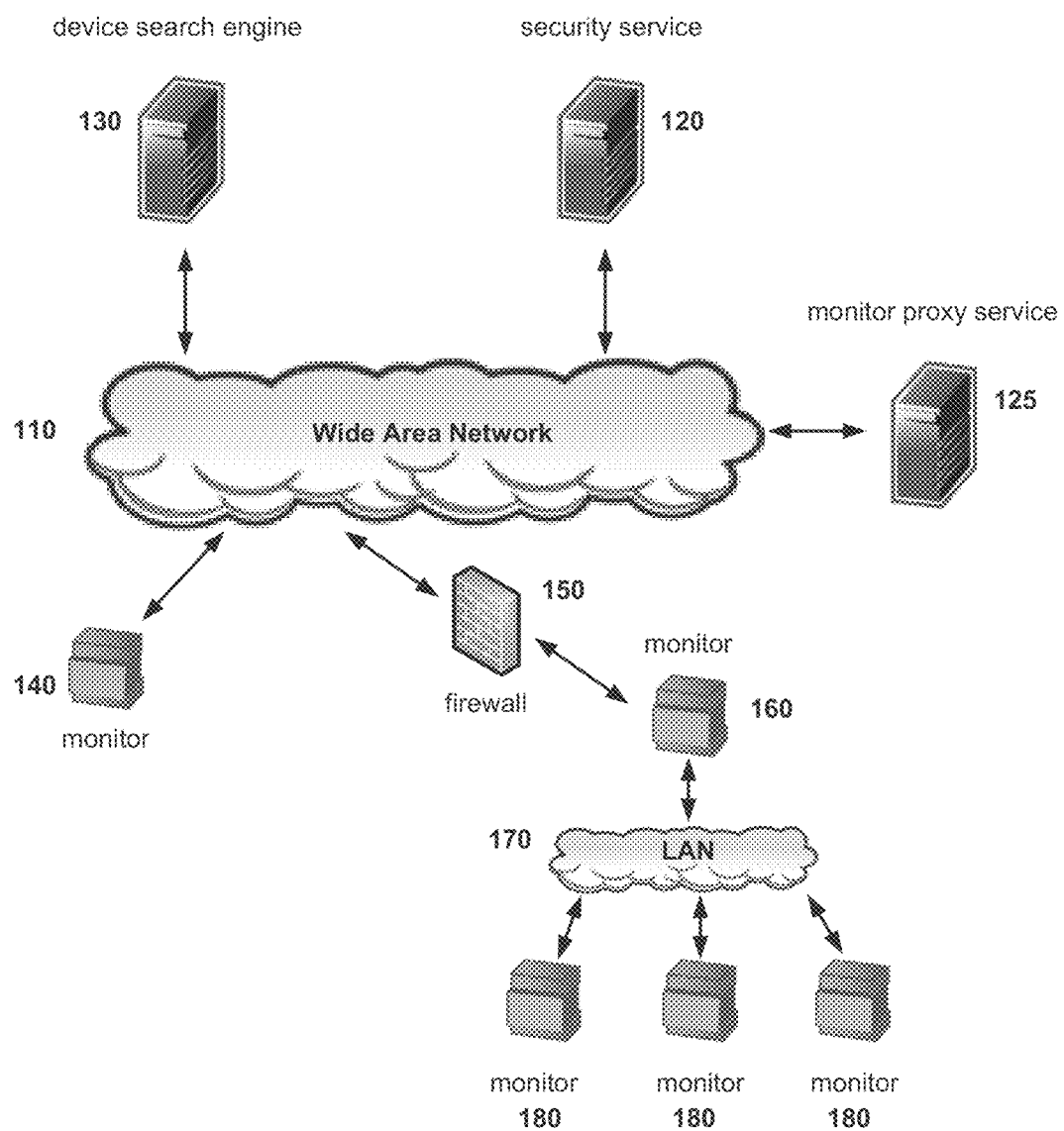
FIG. 1 shows the main components of a system that includes one embodiment of the current invention.

FIG. 1 shows one embodiment of the current invention where main components of a system, that includes monitoring devices, a security service, and a device search engine, are attached to a common public communications network (such as the Internet). A first monitor 140 is connected directly to a Wide Area Network ("WAN") 110, with all Internet protocol ("IP") ports supported by the first monitor 140 available to other devices connected to the WAN 110. A second monitor 160, on the other hand, is connected to the WAN 110 through a firewall 150, which is configured to only allow communication between the second monitor 160 and devices connected to the WAN 110 via specified IP ports. The second monitor 160 is also connected to Local Area Network (LAN) 170 and can freely communicate with third monitors 180. Finally, several services are connected to the WAN 110 as well, including a security service 120, a monitor proxy service 125, and a device search service engine 130.

Unlike content search engines (such as Google, http://www.google.com) that are designed to index the content hosted by servers attached to the Internet, device search engines (such as Shodan, http://www.shodanhq.com) are designed to find devices attached to the Internet and index metadata that can be used to find devices of interest. The device search engine 130 performs broad scans over wide ranges of IP addresses, probing select IP ports and looking for specific characteristics in responses that indicate a device of interest has been found. The device search engine 130 stores the responses received from devices found by this broad scanning activity, and creates a search index that allows users to submit queries for specific elements within these stored responses. For example, the first monitor 140 may be a power monitoring device that supports HTTP, FTP, and Telnet services for sharing data and user interaction. The IP address of the first monitor 140 may not be published or referenced in web pages that might normally be indexed by a typical content search engine, but the scanning activity of the device search engine 130 discovers the IP address of the first monitor 140 and indexes the responses from the first monitor 140 when it is probed on HTTP, FTP, and Telnet ports. These responses contain information (e.g., the name of the manufacturer, a specific version of embedded software on the device, user entered strings stored on the device (such as device owner, physical location of the device, and identification of the equipment or circuit monitored by the monitor), a device model number, etc.) that can be included in a search query to the device search engine 130 to find the first monitor 140 (and other similar devices).

Monitoring system best practices often recommend against directly connecting embedded devices to the Internet. However, as discussed above, it is possible that someone within an organization will intentionally (or unintentionally) directly connect an embedded device to the Internet. Even if a monitoring device is not initially connected directly to the Internet, it is possible that network configuration changes over time will result in the device being connected directly. To aid device owners with securing access to their devices, a security service 120 employs several approaches to discovering and registering monitoring devices that may be attached to the Internet (described in more detail below with reference to FIGS. 2 and 3). Once a device is registered, the device owner specifies preferences for which security scans to perform (if any), and for what actions to take if a specified security scan determines that the device is accessible on the Internet. In one embodiment, the predetermined action to take may be to configure the monitoring device to disable specific services (e.g., HTTP and FTP) and to form an encrypted communications link with a monitor proxy service.

For example, the security service 120 may discover that the first monitor 140 is accessible on the Internet via HTTP and FTP, and owner preferences for the first monitor 140 may specify that it should be accessible only via a monitor proxy service. In this embodiment, the security service 120 then configures the first monitor 140 to disable its HTTP and FTP services, and directs the first monitor 140 to form an encrypted communications link to the monitor proxy service 125. Users wishing to communicate with the first monitor 140 now direct their requests to the monitor proxy service 125, which sends the request to the first monitor 140, retrieves the response, and passes the response on to the user. Some aspects and advantages of a monitor proxy are described in more detail in U.S. patent application Ser. No. 12/650,640, "Power Monitoring System with Proxy Server for Processing and Transforming Messages and Context-Specific Caching".

Monitoring system best practices also often recommend that devices are secured behind a firewall. However, it is possible for the firewall to be configured incorrectly and directly connect specific IP ports on a device to the Internet. In this case, the security service may detect that a firewall may be between the Internet and a monitoring device if only a subset of enabled IP services are accessible from the Internet. For example, the second monitor 160 in FIG. 1 may be connected to the WAN 110 via the firewall 150. In this example, the firewall 150 is configured to block all IP ports between the second monitor 160 and the WAN 110 except for a port 80 (HTTP service), even though FTP and Telnet services are also enabled on the second monitor 160. When the security service 120 detects that the second monitor 160 is accessible over the WAN 110 via HTTP, the security service 120 probes further and determines that the second monitor 160 is not accessible via FTP and Telnet, even though these services are enabled. In any case, the security service 120 retrieves owner preferences for the second monitor 160, and takes the actions specified.

Continuing with the previous example, the second monitor 160 is also connected through the internal LAN 170 to the third monitors 180. In this extended example, although the firewall 150 is configured to allow HTTP access via the WAN 110 to the second monitor 160, the firewall is not configured to pass any communication from the WAN 110 to the third monitors 180. Once the security service 120 is in contact with the second monitor 160, one additional feature is the ability to configure the second monitor 160 to act as a gateway for the third monitors 180, making information on the third monitors 180 available to authenticated users connected to the WAN 110 in a controlled fashion. In one embodiment, the owner preferences for the second monitor 160 state that it should be configured to act as a gateway for other monitors attached to the LAN 170. The security service 120 then configures the second monitor 160 to form an encrypted communications link to the monitor proxy server 125, and users connected to the WAN 110 authenticate with the monitor proxy service 125 in order to gain access to information on the second monitor 160 and the third monitors 180.

Figure 2B:
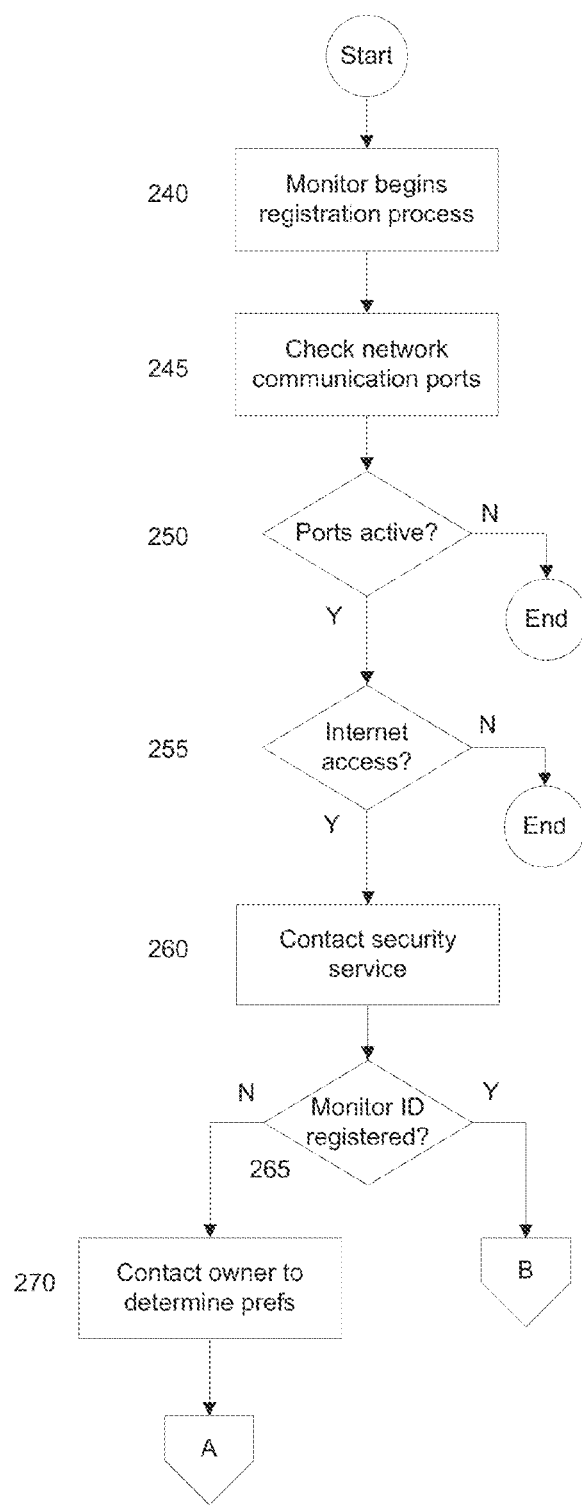
FIG. 2b shows a flow chart illustrating an embodiment of the steps a monitor may take to determine whether or not it is directly connected to the Internet, and if so, register itself with a security service.
Figure 2C:
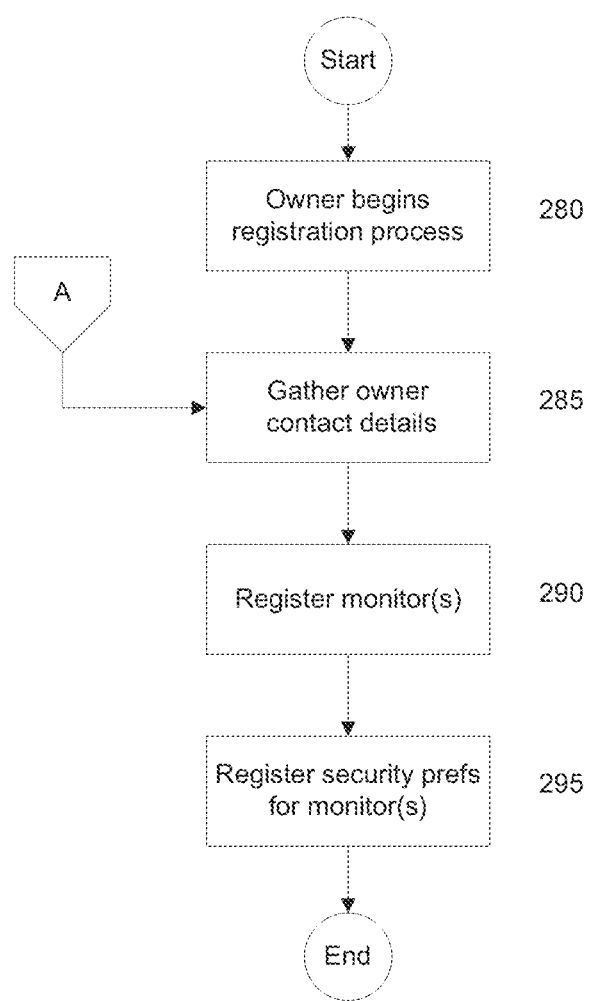
FIG. 2c shows a flow chart illustrating an embodiment of how a monitor owner may contact a security service in order to directly register a monitor with the service.

The flowcharts in FIGS. 2b-2c describe embodiments by which monitors attached to the Internet are discovered and registered with a security service. FIG. 2a describes an embodiment of how the security service interacts with the device search engine to find monitors that may be directly connected to the Internet. FIG. 2b describes an embodiment of the steps a monitor may take to determine whether or not it is directly connected to the Internet, and if so, register itself with the security service. Finally, FIG. 2c describes an embodiment of how a monitor owner may contact the security service in order to directly register a monitor with the service.

Turning now to FIG. 2a, in step 210 the security service 120 uses the device search engine 130 and performs a search in an attempt to find monitors that are not already registered with the security service 120. In one embodiment, monitors purposely include a vendor ID and monitor ID in the responses they provide for supported IP services, and the security service 120 searches for these vendor IDs in the responses indexed by the device search engine 130. In step 215, the security service 120 ends the search process if a vendor ID of interest is not found; otherwise, the service extracts a monitor ID from the device search engine 130 results (or performs a separate query to the detected device to retrieve a monitor ID) and continues to step 220. In step 220, the security service 120 checks a database associated with the security service 120 to see if the monitor ID matches that of a device already registered with the service. This database may be stored within the security service 120 itself, or otherwise accessible by the security system 120 but stored externally to the security service 120. If the device is registered, the security service 120 executes the steps described later with respect to FIG. 3. If the device is not registered, the security service 120 searches other available databases (such as Sales and Customer Contact databases) stored within the security service 120 itself or otherwise accessible by the security system 120 but stored externally thereto, and attempts to automatically contact the monitor owner, as shown in step 230. For example, the security service 120 may send an automated e-mail, telephone call, or text message to the monitor owner. The security service 120 may also add a task to a customer relationship management system queue that directs a customer service representative to contact the monitor owner. The security service 120 then continues to execute the steps described in FIG. 2c.

In an alternate embodiment, the security service 120 searches for character strings that have a high likelihood of belonging to devices of interest. As an example, the following sample HTTP header response from a monitor may be captured and indexed by device search engine 130:

HTTP/1.0 401 Unauthorized
WWW-Authenticate: Basic realm="8600 ION"
Content-Type: text/html
Server: Allegro-Software-RomPager/3.10

In this example, the HTTP header response contains the device type, and the security service 120 could search for the string "8600 ION" to find all such devices discovered by the device search engine 130. The search results from the device search engine 130 will also include the IP address for each discovered device, which the security service 120 can use to further probe discovered devices. To determine the monitor ID, the security service 120 may send requests to the monitor to retrieve data not captured by device search engine 130. As an example, once the security service 120 has discovered a monitor, it may send a request for a monitor web page via HTTP, and parse the web page for the monitor serial number.

In FIG. 2b, in step 240 a monitor begins the process of determining if it is accessible from the Internet, and if so, registering with the security service 120. In step 245, the monitor first checks all communication ports capable of Internet communications to see if they are enabled. In step 250, if no such ports are enabled, the process stops, but if at least one such communication port is enabled, the process continues to step 255. In step 255, the monitor checks to see if it can contact a service on the Internet. This check might be accomplished by using common IP applications such as HTTP or ping, and attempting to contact a predetermined service likely to be up and running (such as the Google home page). Alternately, the security service 120 may maintain a sub-service expressly for monitors attempting to determine their Internet connectivity. In step 260, if the monitor determines that it does have access to an Internet service, the monitor contacts the security service 120 and provides its monitor ID. In step 265, the security service 120 checks a database associated with the security service 120 to see if the monitor ID is already registered. If the device is registered, the security service 120 executes the steps described in FIG. 3. If the device is not registered, the security service 120 searches other available databases (such as Sales and Customer Contact databases) and attempts to contact the monitor owner, as shown in step 270. For example, the security service 120 may send an automated e-mail, telephone call, or text message to the monitor owner. The security service 120 may also add a task to a customer relationship management system queue that directs a customer service representative to contact the monitor owner. The security service 120 then continues to execute the steps described in FIG. 2c.

In an alternate embodiment, a monitor setting must be enabled before the steps described above are executed. This setting allows monitor owners to explicitly opt into the monitor self-registration process—in this scenario, monitors would be shipped from the manufacturer with this setting disabled by default.

In FIG. 2c, in step 280 a "device owner" begins the process of registering with the security service 120. The security service 120 gathers contact information for the owner in step 285, and this contact information may include typical contact information (address, phone number, e-mail, company name, names of multiple monitor owner contacts (including their job titles), addresses of monitor owner site locations (especially those likely to have monitors), etc) as well as other customer IDs that link the owner to the monitor(s) being registered (sales order IDs, customer relationship management database IDs, etc). This contact information makes it easier for the security service 120 to match newly detected monitor IDs with their owners.

The terms "device owner", "owner", and the like are meant as a broad terms which encompass a variety of people associated with the device as opposed to those people on the security system side. In this regard, it is possible that several different users in a variety of roles may be responsible for managing a device. As an example, an engineering manager may place an order for one or more devices to be installed at a site, but an independent manufacturer's representative may be listed as the contact in the manufacturer's customer relationship management ("CRM") database. Further, once the device is installed at the customer site, an IT manager at the site may be given the responsibility of managing device security, and the engineering manager (who uses the data from the device) may prefer that the IT manager be responsible for managing device security preferences and receiving alerts. As such, the terms "device owner", "owner", and the like are meant to refer to all of these people, as well as others on the "device side" who may be involved in managing the device, as opposed to those on the "security system side". Thus, the terms "device owner", "owner", and the like are not strictly limited to the precise legal owner of the device.

In step 290, the device owner registers one or more monitors with security service 120. The owner may do so by simply providing monitor IDs, which the security service 120 may optionally match against other available information (such as sales orders) to help ensure that the monitor IDs which are registered are associated with monitors that belong to the owner. Additionally, the device owner may specify that all new monitors detected by security service 120 that belong to the owner should be automatically registered.

In step 295, the device owner specifies security preferences for monitors registered with security service 120. By way of example, these preferences may include the following actions on the part of the security service:

Enable or disable security scans;
Specify which security scans to execute;
Specify when to execute security scans (event-driven and/or at specific time intervals);
Monitor IP services to enable or disable;
Whether or not to connect to a specified monitor proxy service;
Whether or not to act as a gateway for other monitors on the same LAN;
Who to contact when a monitor is found to not comply with its configured security preferences; and
Who to contact when new monitors are detected.

To ease the management of security preferences, a set of selected preferences may be grouped into an optional preferences template, and a template can be associated with a monitor. Optionally, a global template of security preferences may be defined that apply to all monitors associated with an owner. Optionally, a default template may be defined that is applied to new monitors that are detected by the security service.

Figure 3:
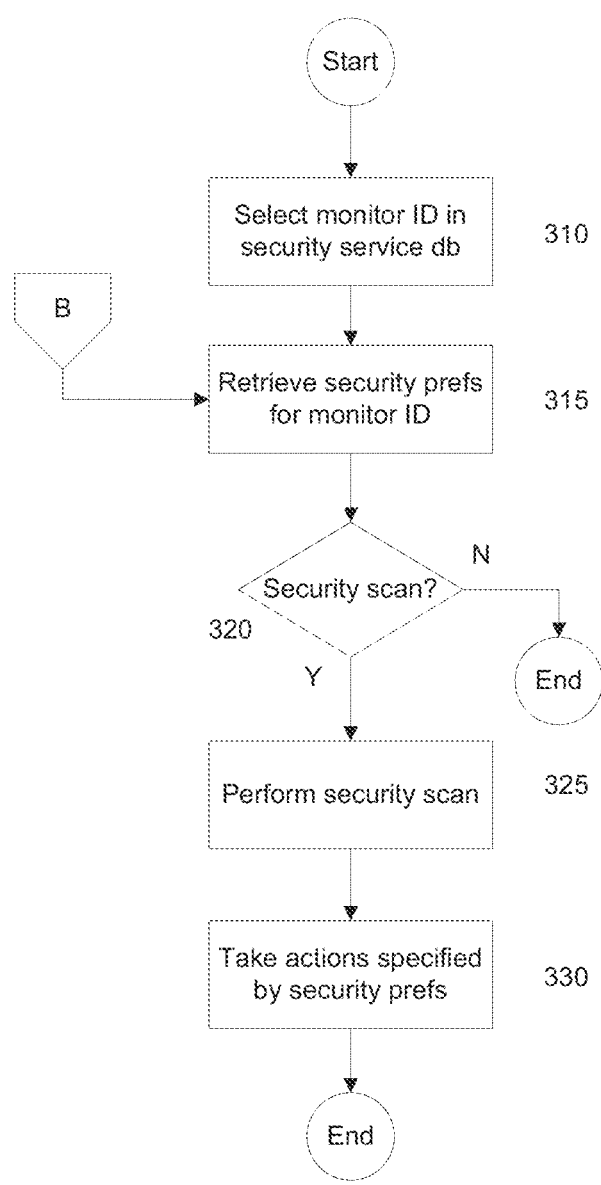
FIG. 3 shows a flow chart illustrating an embodiment of the steps that a security service may take at regular intervals (or event-driven instances) to check the current security status of registered monitors.

Once monitors are registered with security service 120, FIG. 3 describes the steps that the security service 120 takes at regular intervals (or event-driven instances) to check the current security status of registered monitors. The time interval and/or event conditions may be specified in the security preferences for each registered monitor. In one example, the security service may be directed to perform a security scan for select registered monitors once per week. In another example, the security service may be directed to perform a security scan when a specified event occurs, such as when a monitor is first registered with the security service. In yet another example, the security service may be directed to scan for additional devices within a subset of IP addresses similar to that of a newly discovered/registered monitor. Another example of an event that may trigger the security scan is an ad-hoc request from the device owner. Yet another example of such an event may be the discovery of a flaw or exploit in a particular version of device firmware (or a range of firmware for one or more device models), which prompts the service to scan for such devices connected to and exposed on a public network.

In step 310, the security service 120 selects the monitor ID for a registered monitor and in step 315 retrieves the security preferences for the selected monitor. In step 320, if the security preferences state that no security scan should take place for the selected monitor, the process stops. Otherwise, if security scans are enabled, the security service 120 proceeds to step 325 and executes the scans defined in the security preferences. By way of example, defined security scan activity may include the following:

Attempt to access the monitor using specified IP services (such as HTTP, FTP, HTTPS, SFTP, SMTP, SNMP, SSH, WebDAV, DNP, Modbus TCP, Telnet, etc); and If user authentication is enabled, check if the default credentials are used.

In step 330, the security service 120 compares the results of the security scan against the expected behavior defined by the security preferences, and takes the actions specified by those preferences. In one example, the security preferences may state that the HTTP service on monitor 140 should be accessible from the Internet, but the default user credentials should not be active, and no other IP services should be enabled. If the security service 120 performs a security scan of monitor 140 and discovers that FTP is enabled and the default user credentials are used, the security preferences may direct that the service (a) disable FTP; and (b) contact the IT manager within the owner's organization and notify the IT manager that the default user credentials are in use. An example of "user credentials" is the combination of a login with password. The term "default user credentials" also encompasses the default access means that ship with a monitor, such as including a default account with name "guest" and password "0", or a hidden account that is not publicly documented (such as an account with name "factory" and password "secret"). In addition to a traditional user name and password combination, "user credentials" can also be digital keys (such as those used in public key cryptography).

The security service described above may be embodied in a typical computer system that is configured to perform the relevant steps described above. For example, the steps may be embodied in a computer program that is accessible by the security service computer. The security service may also include a controller, firmware, a memory, and a communications interface.

Similarly, the monitor described above may also be embodied in a typical computer system that is configured to perform the relevant steps described above. For example, the steps may be embodied in a computer program that is accessible by the monitor. In addition, the monitor may be an electrical power monitoring system coupled to an electrical power distribution system for sensing a storing data representing operating characteristics (e.g., voltage, current, waveform distortion, power, etc.) of the power distribution system. These characteristics may be analyzed by a user to evaluate potential performance or quality-related issues. One specific example of a monitor is the PowerLogic ION7650 (more details at http://www.powerlogic.com/product.cfm/c_id/1/sc_id/2/p_id/2). Other relevant monitor devices include breaker trip units, protective relays, and embedded communication gateway servers. In general, a monitor may be described as a device that is coupled to both a public network and an electrical power distribution system, and performs the methods described herein. The monitoring device may include a controller, firmware, a memory, a communications interface, and connectors that connect the monitor to power line conductors of the power distribution system. The firmware generally includes machine instructions for directing the controller to carry out operations required for the monitoring device, and the memory stores the electrical parameter data measured by the monitoring device.

As a result of the methods and devices described above, a security service can be configured to automatically find an unregistered monitor, register a monitor, and configure a monitor to conform with preset security preferences, thereby eliminating the need for human interaction on the side of the security service with respect to these tasks. Similarly, a monitor can be configured to automatically check whether or not it is registered with a security service, thereby eliminating the need for human interaction on the side of the monitor with respect to this task.

The present invention has been illustrated and described with respect to specific embodiments thereof, which embodiments are merely illustrative of the principles of the invention and are not intended to be exclusive or otherwise limiting embodiments. Accordingly, although the above description of illustrative embodiments of the present invention, as well as various illustrative modifications and features thereof, provides many specificities, these enabling details should not be construed as limiting the scope of the invention, and it will be readily understood by those persons skilled in the art that the present invention is susceptible to many modifications, adaptations, variations, omissions, additions, and equivalent implementations without departing from this scope and without diminishing its attendant advantages. For instance, except to the extent necessary or inherent in the processes themselves, no particular order to steps or stages of methods or processes described in this disclosure, including the figures, is implied. In many cases the order of process steps may be varied, and various illustrative steps may be combined, altered, or omitted, without changing the purpose, effect or import of the methods described. It is further noted that the terms and expressions have been used as terms of description and not terms of limitation. There is no intention to use the terms or expressions to exclude any equivalents of features shown and described or portions thereof. Additionally, the present invention may be practiced without necessarily providing one or more of the advantages described herein or otherwise understood in view of the disclosure and/or that may be realized in some embodiments thereof. It is therefore intended that the present invention is not limited to the disclosed embodiments but should be defined in accordance with the claims that follow.

What is claimed is:

1. A method for determining whether or not a monitor is registered with a security service that comprises a computer system operable in executing program code stored on at least one non-transitory computer readable medium to cause the computer system to perform the method comprising:
the computer system of the security service using a device search engine to perform a search for and find a monitor based on a search query provided to the device search engine by the computer system, wherein the device search engine discovers devices by scanning IP addresses, and comprises a search index having data elements that are searched according to the search query and that correspond to information received by the search engine from the discovered devices in response to the search engine probing ports of the discovered devices;
the computer system determining whether or not the found monitor is registered with the security service; and
when the found monitor is not currently registered with the security service, the computer system automatically contacting an owner of the unregistered monitor.

2. The method according to claim 1;
wherein the determining step includes comparing a vendor ID of the found monitor with a predetermined list of vendor IDs.

3. The method according to claim 2;
wherein the determining step further includes the computer system comparing a monitor ID of the found monitor with a predetermined list of monitor IDs, when the vendor ID of the found monitor matches a vendor ID of the predetermined list of vendor IDs;
wherein, when the monitor ID of the found monitor matches a monitor ID of the predetermined list of monitor IDs, it is determined that the found monitor is registered with the security service; and
wherein, when the monitor ID of the found monitor does not match any monitor ID of the predetermined list of monitor IDs, it is determined that the found monitor is not registered with the security service.

4. The method according to claim 1;
wherein the computer system of the security service automatically invokes contacting of the owner of the unregistered monitor by at least one of:
sending an automated e-mail to the owner of the unregistered monitor;
sending a telephone call to the owner of the unregistered monitor
sending a text message to the owner of the unregistered monitor; and
adding a task to a customer relationship management system queue that directs a customer service representative to contact the monitor owner.

5. The method according to claim 1, further comprising:
the computer system automatically registering the unregistered monitor with the security service upon receipt of an instruction by the owner of the unregistered monitor to register the unregistered monitor.

6. The method according to claim 1;
wherein the owner of the unregistered monitor is selected from a group comprising:
an engineering manager, an independent manufacturer's representative, a contact in a customer relationship management ("CRM") database associated with the monitor, and an IT manager.

7. A security service device comprising:
an electronic data storage medium; and
an electronic data processing device;
wherein the security service device is configured to:
use a device search engine to perform a search for and find a monitor based on a search query provided to the device search engine by the computer system, wherein the device search engine discovers devices by scanning IP addresses, and comprises a search index having data elements that are searched according to the search query and that correspond to information received by the search engine from the discovered devices in response to the search engine probing ports of the discovered devices; and
when the found monitor is not currently registered with the security service device, automatically contact an owner of the unregistered monitor.

8. The security service device according to claim 7;
wherein the security service device is further configured to compare a vendor ID of the found monitor with a predetermined list of vendor IDs.

9. The security service device according to claim 8;
wherein the security service device is further configured such that, when the vendor ID of the found monitor matches a vendor ID of the predetermined list of vendor IDs, the security service device compares a monitor ID of the found monitor with a predetermined list of monitor IDs;
wherein the security service device determines that the found monitor is registered with the security service device if the monitor ID of the found monitor matches a monitor ID of the predetermined list of monitor IDs; and
wherein the security service device determines that the found monitor is not registered with the security service device if the monitor ID of the found monitor does not match any monitor ID of the predetermined list of monitor IDs.

10. The security service device according to claim 7;
wherein the security service device automatically contacts the owner of the unregistered monitor by at least one of:
sending an automated e-mail to the owner of the unregistered monitor;
sending a telephone call to the owner of the unregistered monitor
sending a text message to the owner of the unregistered monitor; and
adding a task to a customer relationship management system queue that directs a customer service representative to contact the monitor owner.

11. The security service device according to claim 7;
wherein the security service device is further configured such that, upon receipt of an instruction by the owner of the unregistered monitor to register the unregistered monitor, the security service device automatically registers the unregistered monitor.

12. The security service device according to claim 7;
wherein the owner of the unregistered monitor is selected from a group comprising:

an engineering manager, an independent manufacturer's representative, a contact in a customer relationship management ("CRM") database associated with the monitor, and an IT manager.

* * * * *